United States Patent [19]

Robinson

[11] Patent Number: 4,930,448

[45] Date of Patent: Jun. 5, 1990

[54] ANIMAL TOY

[76] Inventor: Randall W. Robinson, 2165 Paradise Dr., Tiburon, Calif. 94920

[21] Appl. No.: 371,061

[22] Filed: Jun. 26, 1989

[51] Int. Cl.$^5$ ............................................. A01K 15/02
[52] U.S. Cl. ..................................................... 119/29
[58] Field of Search .................... 119/29, 51.12, 29.5; 446/227, 228, 236

[56] References Cited

U.S. PATENT DOCUMENTS

| 1,699,308 | 1/1929 | Postings | 119/29 |
| 2,831,457 | 4/1958 | McMurry | 119/29 |
| 3,055,660 | 9/1962 | Alexander | 446/228 |
| 3,136,544 | 6/1964 | Strayer | 446/236 |
| 3,295,499 | 1/1967 | Manchester | 119/29 |
| 3,417,498 | 12/1968 | Anthony | 446/236 |
| 3,803,735 | 4/1974 | Stubbmann | 446/236 |
| 3,826,231 | 7/1974 | Crawford et al. | 119/51.12 |
| 3,919,795 | 11/1975 | Van Horne Jinivisian et al. | 446/227 |
| 4,077,360 | 3/1978 | Figlia | 119/51.12 |
| 4,499,855 | 2/1985 | Galkiewicz | 119/29 |
| 4,517,922 | 5/1985 | Lind | 119/29 |
| 4,640,034 | 2/1987 | Zigholtz | 446/227 |
| 4,712,510 | 12/1937 | Tae-Ho | 119/29 |
| 4,728,311 | 3/1988 | Magers | 446/228 |
| 4,735,171 | 4/1988 | Essex | 119/51.12 |

*Primary Examiner*—Paul J. Hirsch
*Attorney, Agent, or Firm*—Brown, Martin, Haller & McClain

[57] ABSTRACT

A toy device for a pet animal comprises a base housing having an upper wall and an opening in the upper wall, a rotatable member rotatably mounted in the housing, a drive assembly for rotating the member, an elongate member secured at one end to the rotatable member and extending upwardly and then in a generally sideways direction away from the housing, and an object secured to the free end of the elongate member for movement in a path around the housing on rotation of the rotatable member. The object may be of any desired shape such as a ball, mouse, butterfly, or other creature and is preferably arranged to be dragged along the ground in a generally circular path by rotation of the rotatable member.

12 Claims, 1 Drawing Sheet

ANIMAL TOY

BACKGROUND OF THE INVENTION

The present invention relates generally to a toy or amusement device for a pet animal such as a dog or cat.

Pet owners typically purchase a variety of toys such as balls and the like for the amusement of their pets. However, most of these do not hold the attention of the pet for very long since they typically do not move on their own or do anything to attract the animal's attention.

SUMMARY OF THE INVENTION

It is an object of this invention to provide an improved toy device for amusing a pet animal such as a cat or dog.

According to the present invention, a toy device is provided which comprises a base, a rotatable member rotatably mounted on the base, a drive assembly for rotating the rotatable member, an elongate member such as a pliable wire or cord secured at one end to the rotatable member and extending in a generally sideways direction away from the base, and an object secured to the free end of the elongate member for traveling in a path around the base. The base preferably comprises a housing in which the rotatable member and drive assembly are mounted, the housing having an opening in its upper wall through which the elongate member projects. The elongate member may be flexible. In the preferred embodiment of the invention the elongate member comprises a pliable wire or rod which extends upwardly out of the housing and is then bent down in an arch in a sideways direction away from the housing. The object may be directly secured to the free end of the wire but is preferably secured to it by a length of string so that it is dragged along on the ground by rotation of the wire.

The housing may be of any desired shape and may, for example, be of animal shape, for example in the shape of a sleeping cat. The object may also be of an attractive shape which a pet would be likely to chase, for example in the shape of a butterfly, mouse, bird or other creature, or may comprise a ball of cotton or yarn. The object is releasably secured to the end of the elongate member or cord to allow replacement when it becomes worn or damaged from play. The housing and its contents are preferably of sufficient weight that the pet will be unlikely to turn it over or drag it around during play.

In order to make the toy operation even more interesting to the animal, a speed control may be included for varying the speed of rotation of the rotatable member, and thus the speed of movement of the object. Additionally or alternatively, a timer may be provided for repeatedly turning the drive motor on and off so that the object starts and stops repeatedly. An externally mounted switch on the housing is preferably provided for activation of the toy.

This toy device will be appealing to most pets, since they will be attracted by the movement of the object and will tend to chase and play with it.

BRIEF DESCRIPTION OF THE DRAWINGS

The present invention will be better understood from the following detailed description of a preferred embodiment, taken in conjunction with the accompanying drawings, in which like reference numerals refer to like parts and in which.

DESCRIPTION OF THE PREFERRED EMBODIMENT

Figure 1:
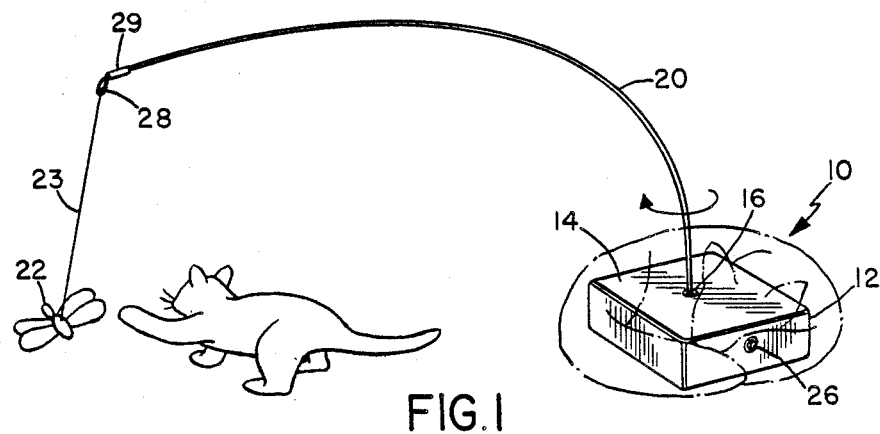
FIG. 1 is a perspective view of the complete toy apparatus according to a preferred embodiment of the invention.

The drawings illustrate a toy device or apparatus 10 according to a preferred embodiment of the present invention, which is particularly intended for the amusement of cats or other pet animals. The device basically comprises a base or housing 12 which is designed for resting on the ground, and has an upper wall 14 with an opening 16, which may be centrally located as illustrated or may be offset if desired. A shaft 18 is rotatably mounted on the base of the housing in alignment with opening 16. An elongate, pliable wire or rod 20 is secured at one end to the shaft 18 and extends upwardly out of the housing through opening 16 and then curves downwardly in a sideways direction away from the housing. An object 22, which may be of any desired shape such as a ball, bird, mouse or other creature, is secured to the free end of the wire 20 via a length of string 23. A drive assembly 24 in the housing rotates shaft 18, simultaneously rotating wire 20 and dragging object 22 along the ground in a circular path around the housing 12. An on-off switch 26 mounted to project out of the housing controls operation of the drive assembly 24 by connecting a suitable power supply, such as one or more standard batteries 27, to the drive unit.

The cord or wire 20 is of sufficient length to enable object 22 to be dragged along the ground in a relatively long path around the housing. In the illustrated example, the path is circular. However, the wire may be eccentrically mounted on a cam on shaft 18, for example, to provide an erratic or non-circular path if desired. The wire may be of any suitable material, such as pliable stainless steel wire. In the illustrated embodiment, the object is releasably attached by string 23 to a loop 28 at the free end of the wire. This allows the object to be replaced relatively easily when it becomes worn or damaged by a pet. However, the object may alternatively be attached directly to the end of wire 20 if desired, with the wire being long enough to allow the object to rest on the ground. The wire may be arranged to be coiled inside the housing when the toy is not in use, for easier storage. Alternatively, the wire may be formed of two or more telescoping sections in the manner of a vehicle antenna, with the sections having a directional cross-section such as triangular or elliptical to avoid binding as a result of curvature. In the preferred embodiment, wire 20 is of around 3 feet in length, and extends upwardly about 18 inches before arching sideways away from the housing. The string may be of one to two feet in length. In one specific example, wire 20 was of 0.032 inch diameter stainless steel, while string 23 was of lightweight nylon material. Loop 28 was also a nylon cord secured to the free end of wire 20 within rubber sleeve 29.

Figure 4:
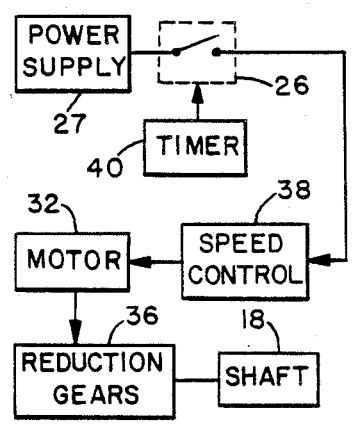
FIG. 4 is a block diagram illustrating the drive unit with some optional modifications.
Figure 2:
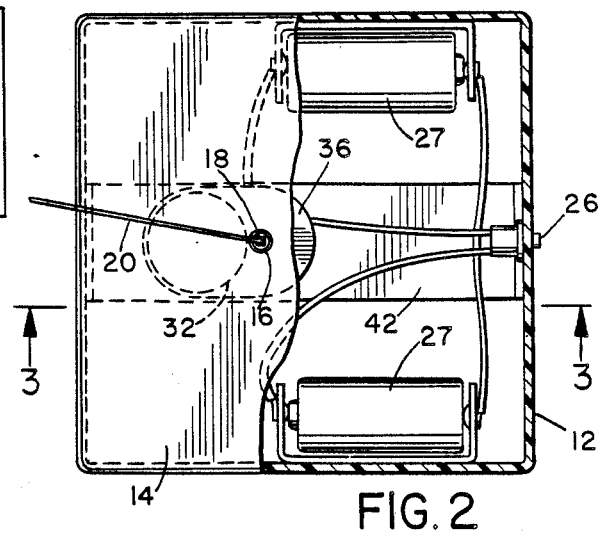
FIG. 2 is an enlarged top plan view of the base housing, partially cut away to show the drive unit.
Figure 3:
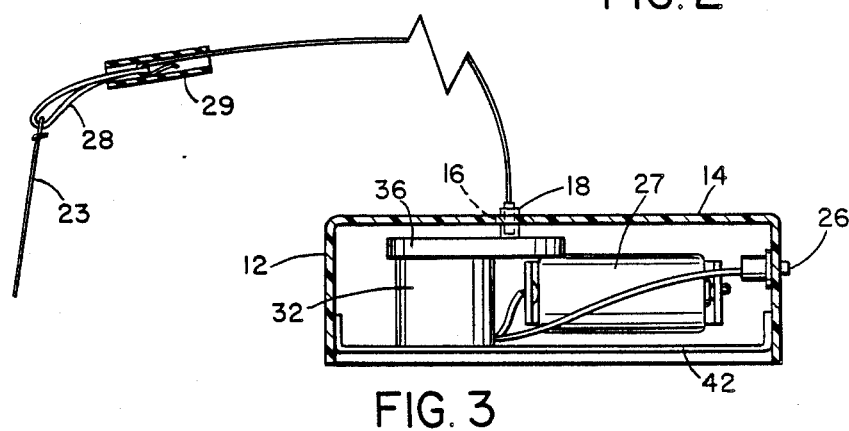
FIG. 3 is a sectional view taken on line 3—3 of FIG. 2.

The drive assembly 24 is illustrated in more detail in FIG. 4. A suitable power supply 27 such as one or more batteries, which are replaceably mounted in the housing as illustrated in FIG. 2, is connected to a drive motor 32 via switch 26, and the drive motor is linked to rotatable shaft 18 via reduction gears 36. Preferably, the drive assembly is arranged to move the object 22 relatively slowly, for example between 20 to 28 revolutions per minute. The reduction gears 36 are arranged to provide the desired speed. FIG. 4 illustrates some optional modifications to the drive assembly 24 in order to provide for a more interesting movement pattern of object 22. For example, a variable speed control 38 may be provided to allow the speed of movement of object 22 to be varied, for example from 5 to 25 r.p.m. This may be manually operated by a suitable external control, or a timer for automatically varying the speed periodically may be included. Also illustrated in FIG. 4 is an optional timer 40 for periodically turning the motor on and off, so the object 22 will be stopped and re-started periodically, for example at 5, 10 or 15 minutes. Various different timing selections may be provided.

Other optional additions to the control circuit include, for example, the provision of a selection of up to three or more different musical tunes to accompany the movement of object 22. Also, the object may be driven intermittently in a stop/start fashion when on, to retain a pet's interest, and the device may be controlled to turn on and off at random intervals during the day.

The housing or base may be of any suitable material, such as clay or plastic material, and is preferably of sufficient overall weight to resist being turned over or dragged around by an animal playing with the toy. If the housing is of relatively lightweight material, the required weight may be provided by the batteries 27 and other internal components. Additional weights may be mounted inside the housing if necessary. As illustrated in the drawings, the housing may be open at its base to allow access for replacement of the batteries when necessary, or a removable base wall may be provided for this purpose. Where the base is open, a transverse supporting bar 42 is provided for mounting of the motor and gearing. The housing may be of simple rectangular shape, or may be shaped in various attractive forms, for example in the shape of a sleeping cat as illustrated in dotted outline in FIG. 1.

In order to operate the toy device, the motor is actuated and the wire 20 will then be rotated, dragging object 22 on the ground in a path around housing 12. As mentioned above, the object may be driven intermittently or continuously, and at constant or variable speeds. The movement will attract the attention of most pets, particularly cats, who will tend to chase and pounce on the object 22. This device can therefore provide much fun and amusement and will be of great appeal to pets and their owners alike. The device may be used indoors or outdoors.

Although a preferred embodiment of the invention has been described above by way of example only, it will be understood by those skilled in the field that modifications may be made to the disclosed embodiment without departing from the scope of the invention, which is defined by the appended claims.

I claim:

1. A toy device for the amusement of pet animals, comprising:
    a base member having a lower surface for freely seating on a substantially flat surface, the lower surface having no projections for connection to the seating surface;
    an elongate, rod-like member rotatably mounted at one end on said base member and extending in an upwardly and radially outwardly arched path away from said base member with its free end spaced radially outwardly from the outer periphery of said base member;
    a single flexible connecting device secured to the free end of said elongate member;
    an object attached to said connecting device opposite and directly below the free end of said member; and
    drive means on said base member for rotating said elongate member to move said object in a path around said base for the amusement of a pet unsecured to said base.

2. The device as claimed in claim 1, including a line secured at one end to said connecting device, the object being secured to the free end of said line.

3. The device as claimed in claim 1, wherein said elongate member comprises a pliable wire.

4. The device as claimed in claim 1, wherein said drive means comprises a power supply, a drive motor mounted in said base, circuit means connecting said power supply to said drive motor, a rotatable member rotatably mounted on said base, said elongate member being releasably secured to said rotatable member, and transmission means connecting said drive motor to said rotatable member.

5. The device as claimed in claim 4, wherein said circuit means includes switch means for controlling connection of the power supply to the motor, said switch means including an actuator externally mounted on said base for controlling operation of said switch means.

6. The device as claimed in claim 4, wherein said circuit means includes variable speed control means for controlling the speed of rotation of said rotatable member.

7. The device as claimed in claim 6, including control means for intermittently varying the speed of said rotatable member.

8. The device as claimed in claim 6, including control means for intermittently turning said motor on and off and for varying the speed of said rotatable member at varying intervals.

9. The device as claimed in claim 6, further including audio means for providing a predetermined sound output on actuation of said drive motor.

10. The device as claimed in claim 1, wherein said connecting device comprises an elongate flexible member, first flexible connecting means at one end of said flexible member for flexibly connecting it to the free end of said elongate member, and second connecting means at the opposite end of said flexible member for connecting it to the object to suspend it below the free end of said elongate member.

11. A device for the amusement of pet animals free and untethered to the device, the device comprising:
    a base member having a lower edge for seating freely on the ground, the lower edge lying in a substantially flat plane and having no protrusions projecting downwardly from said plane;
    an elongate, pliable member having a first end rotatably mounted on said base member, said elongate member extending in an arched path upwardly and outwardly away from said base member with the free end of said elongate member being spaced outwardly from the outer periphery of said base member;

a connecting loop at the free end of said elongate member;

a connecting line secured at one end to said connecting loop;

a toy object secured to the opposite end of said connecting line for suspension directly downwardly from the free end of said elongate member;

drive means in said housing for rotating said one end of said elongate member to drive its free end in a path around said base member, said drive means including a drive motor and switch means for controlling actuation of said drive motor;

said switch means including an actuator on the outside of said housing for switching said motor on and off; and transmission means for connecting said drive motor to said one end of said elongate member.

12. A method of amusing pet animals, comprising the steps of:

seating a base member freely on a ground surface;

suspending a toy object from the free end of an elongate pliable member with the other end rotatably mounted in the base member; and driving the elongate member to rotate and move the toy object in a path around the base member to attract the attention of a pet animal free and unsecured to the elongate member.

* * * * *